US008864450B2

(12) United States Patent
Gasmen et al.

(10) Patent No.: US 8,864,450 B2
(45) Date of Patent: Oct. 21, 2014

(54) GAS TURBINE ENGINE SYNCHRONIZING RING BUMPER

(75) Inventors: Eugene C. Gasmen, Rocky Hill, CT (US); Stanley Wiecko, Newington, CT (US)

(73) Assignee: United Technologies Corporation, Hartford, CT (US)

( * ) Notice: Subject to any disclaimer, the term of this patent is extended or adjusted under 35 U.S.C. 154(b) by 735 days.

(21) Appl. No.: 13/018,512

(22) Filed: Feb. 1, 2011

(65) Prior Publication Data
US 2012/0195755 A1 Aug. 2, 2012

(51) Int. Cl.
*F01D 17/12* (2006.01)
*F01D 25/24* (2006.01)
*F01D 17/16* (2006.01)
*F02C 9/20* (2006.01)

(52) U.S. Cl.
CPC ............ *F01D 17/162* (2013.01); *F01D 25/246* (2013.01); *F05D 2260/50* (2013.01); *F05D 2270/60* (2013.01); *F01D 25/243* (2013.01); *F02C 9/20* (2013.01)
USPC .......................................... 415/160; 415/159

(58) Field of Classification Search
USPC ............ 415/40, 42, 149.1, 149.2, 149.4, 150, 415/153.2, 165, 191, 211.2, 119, 159, 160; 416/44–47, 103–107, 154, 166; 403/408.1, 221, 228, 243, 365; 411/546, 111–113; 13/82, 83, 85, 86 R, 13/86 A, 2.1, 2.5
See application file for complete search history.

(56) References Cited

U.S. PATENT DOCUMENTS

| 2,933,234 | A | | 4/1960 | Neumann |
| 3,584,857 | A | | 6/1971 | Hipsher |
| 4,494,883 | A | | 1/1985 | Winter |
| 4,812,106 | A | * | 3/1989 | Purgavie ...................... 415/139 |
| 4,908,245 | A | | 3/1990 | Shah et al. |
| 4,925,364 | A | | 5/1990 | Das |
| 5,211,537 | A | | 5/1993 | Langston et al. |
| 5,387,080 | A | * | 2/1995 | Bouhennicha et al. ....... 415/150 |
| 5,672,047 | A | | 9/1997 | Birkholz |

(Continued)

FOREIGN PATENT DOCUMENTS

EP 1403467 3/2004
EP 1 524 413 A2 4/2005

(Continued)

OTHER PUBLICATIONS

English Machine Translation FR2882577.*

(Continued)

*Primary Examiner* — Edward Look
*Assistant Examiner* — Wayne A Lambert
(74) *Attorney, Agent, or Firm* — Carlson, Gaskey & Olds, P.C.

(57) ABSTRACT

A gas turbine engine includes a synchronizing ring. A cradle includes an integrally formed anti-rotation feature. The cradle is secured to the synchronizing ring and located relative thereto with the anti-rotation feature. A bumper is slidably supported within the cradle. In one example, a bushing is provided within a hole in the bumper. A fastener is inserted into the hole and a bushing to secure the bumper to the synchronizing ring.

16 Claims, 4 Drawing Sheets

(56) References Cited

U.S. PATENT DOCUMENTS

| | | | |
|---|---|---|---|
| 5,700,129 | A | 12/1997 | Kocian |
| 6,884,025 | B2 | 4/2005 | Pickens et al. |
| 6,984,108 | B2 | 1/2006 | Anderson et al. |
| 7,011,494 | B2 * | 3/2006 | Kies et al. .............. 415/148 |
| 7,094,022 | B2 | 8/2006 | Bruce |
| 7,244,098 | B2 | 7/2007 | Bromann |
| 7,287,955 | B2 | 10/2007 | Amiot et al. |
| 7,445,427 | B2 | 11/2008 | Gutknecht et al. |
| 7,516,534 | B2 | 4/2009 | Easterbrook et al. |
| 7,591,634 | B2 | 9/2009 | Wheeler et al. |
| 8,123,472 | B2 * | 2/2012 | Redgwell .............. 415/160 |
| 2005/0169741 | A1 * | 8/2005 | Kies et al. .............. 415/1 |
| 2006/0193720 | A1 * | 8/2006 | Bromann .............. 415/160 |
| 2007/0110541 | A1 | 5/2007 | Rawlins et al. |
| 2007/0183889 | A1 * | 8/2007 | Bromann .............. 415/160 |

FOREIGN PATENT DOCUMENTS

| | | |
|---|---|---|
| EP | 1561906 | 8/2005 |
| FR | 2882577 | 9/2006 |
| GB | 2206381 | 1/1989 |
| GB | 2273744 | 6/1994 |

OTHER PUBLICATIONS

EP Search Report completed Aug. 23, 2013. Application No. EP 12153325.1 Titled: Gas Turbine Engine Synchronizing Ring Bumper.

EP Extended Search Report completed Nov. 8, 2013. Application No. EP 12153325.1 Titled: Gas Turbine Engine Synchronizing Ring Bumper.

* cited by examiner

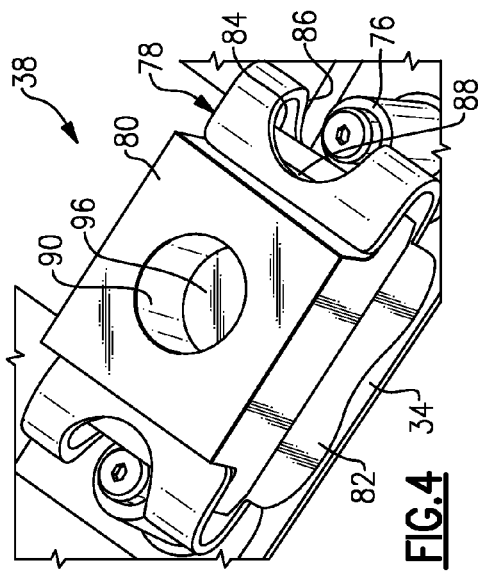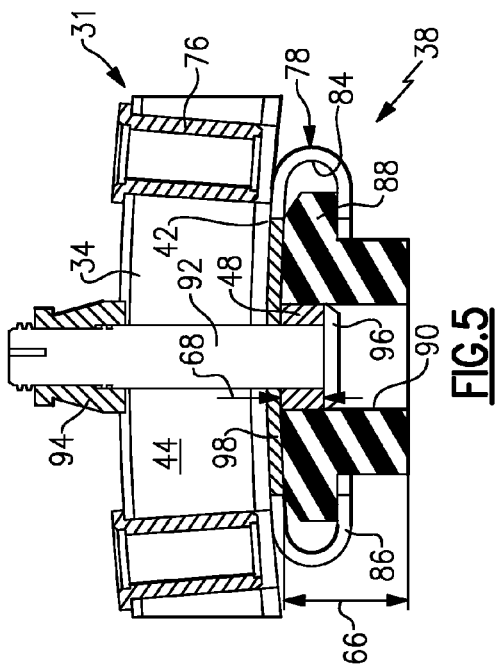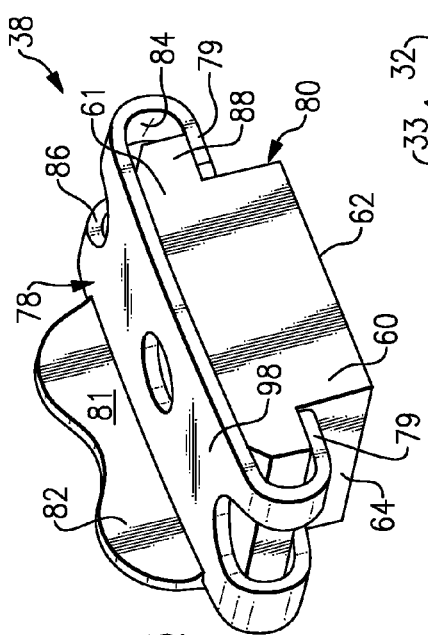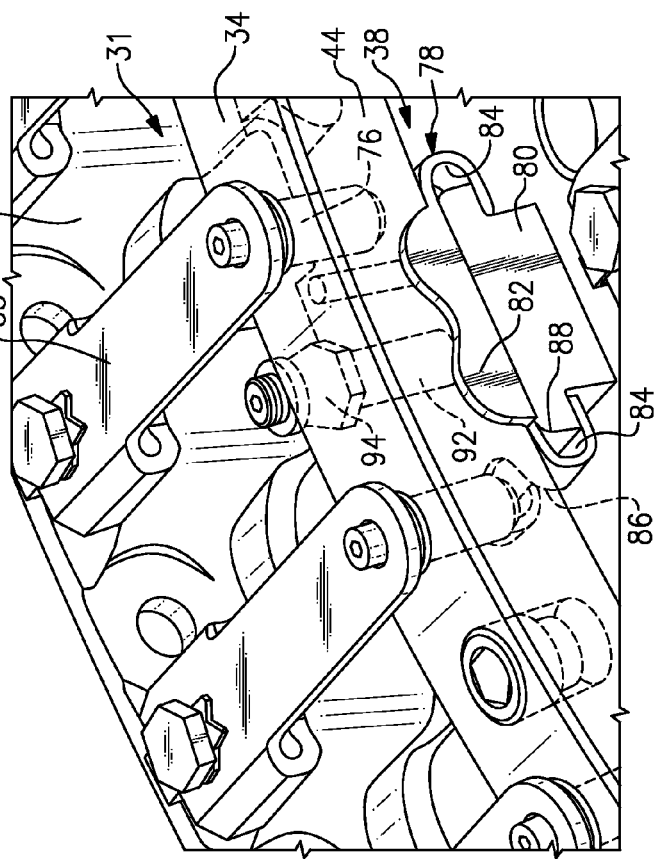

GAS TURBINE ENGINE SYNCHRONIZING RING BUMPER

This invention was made with government support under Contract No. N00019-02-C-3003 awarded by the United States Navy. The Government has certain rights in this invention.

BACKGROUND

This disclosure relates to a gas turbine engine synchronizing assembly. More particularly, the disclosure relates to bumpers used between a synchronizing ring and a compressor case.

Some gas turbine engines utilize variable stator vanes that are actuated about their rotational axes to improve the overall compressor characteristics. A synchronizing assembly is used to manipulate the vanes. One type of synchronizing assembly includes a synchronizing ring that is slid relative to a compressor case by actuators. Multiple bumpers are circumferentially arranged between the synchronizing ring and the compressor case to facilitate movement of the synchronizing ring throughout the changing clearances during engine operation.

In one example, the bumper is constructed from a composite polymer material. The bumper is secured to the synchronizing ring by fasteners. Typically, the composite polymer material is arranged between a head of the fastener and the synchronizing ring such that the composite polymer material is loaded under a clamping force. Over time, the composite polymer material fatigues and cracks, which requires service to the synchronizing assembly.

One example bumper assembly includes a box-like structure machined out of titanium block. The box is secured to the synchronizing ring using a discrete locating pin to prevent rotation of the box during installation of a fastener that is used to secure the bumper assembly to the synchronizing ring. The locating pin must be very precisely machined. The bumper is secured within the box using an adhesive.

SUMMARY

A synchronizing assembly for a gas turbine engine includes a synchronizing ring. A cradle includes an integrally formed anti-rotation feature. The cradle is secured to the synchronizing ring and located relative thereto by the anti-rotation feature. A bumper is supported within the cradle.

In one example, the bumper includes a composite polymer block having a base and a projection integral with and extending from the base to a sliding surface. The base provides mounting flanges on opposing sides of the projection. A hole extends a depth through the base and the projection. The projection has a perimeter shape. A bushing is received in the hole and interference fit at an end opposite the mounting surface and includes a height less than the depth.

A method of assembling the synchronizing assembly includes sliding the bumper into the cradle. The cradle is positioned onto the synchronizing ring with a locating feature arranged exteriorly of the synchronizing ring. A fastener is inserted through holes in the bumper and the cradle. The bumper is fastened to the synchronizing ring without clamping the bumper, for example.

BRIEF DESCRIPTION OF THE DRAWINGS

The disclosure can be further understood by reference to the following detailed description when considered in connection with the accompanying drawings wherein:

FIG. 3 is a side perspective view of another example synchronizing assembly.

FIG. 4 is a bottom perspective view of the synchronizing assembly illustrated in FIG. 3.

FIG. 5 is a cross-sectional view of the synchronizing assembly illustrated in FIG. 3.

FIG. 6 is a perspective view of a bumper and a cradle illustrated in FIGS. 3-5.

DETAILED DESCRIPTION

Figure 1:
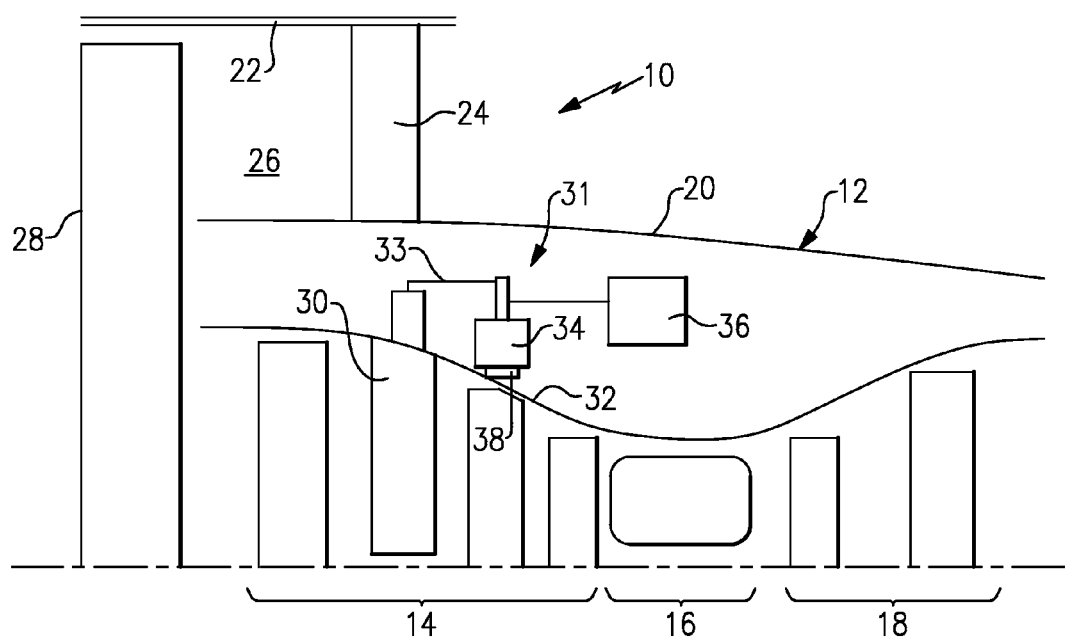
FIG. 1 is a highly schematic view of an example gas turbine engine with a synchronizing assembly.

A gas turbine engine 10 is schematically illustrated in FIG. 1. The engine 10 includes a core 12 having compressor, combustor and turbine sections 14, 16, 18, which are housed within a core nacelle 20. The core 12 is supported relative to a fan case by circumferentially arranged flow exit guide vanes 24. A fan duct 26 is provided between the fan case 22 and the core nacelle 20 and receives airflow from a fan 28.

In the example engine 10, the compressor section 14 includes at least one stage of variable stator vanes 30 that are actuated by a synchronizing assembly 31 to rotate the vanes 30 about their respective axes to improve the overall efficiency of the compressor section 14.

Figure 2:
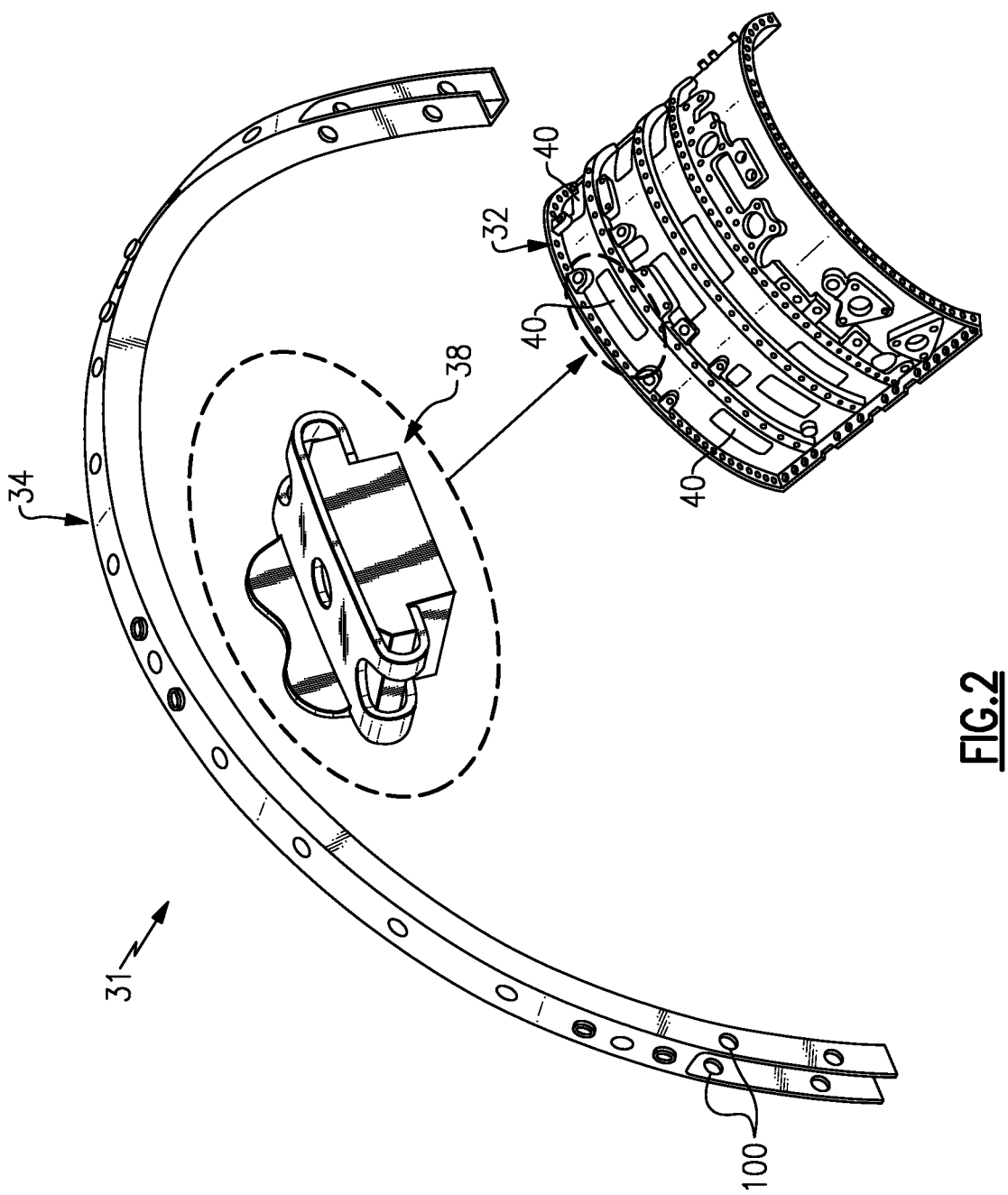
FIG. 2 is an exploded view of a portion of a synchronizing assembly and its corresponding compressor case.

The synchronizing assembly 31 includes a synchronizing ring 34 interconnected to the vanes 30 by arms 33. The synchronizing ring 34 is slidably mounted to a compressor case 32. An actuator 36 moves the synchronizing ring 34 in a generally axial direction along an arcuate path to rotate the vanes 30. Bumper assemblies 38 are arranged circumferentially between the synchronizing ring 34 and the compressor case 32. As illustrated in FIG. 2, the bumper assemblies 38 are supported on pads 40 circumferentially arranged on the exterior of the compressor case 32. The synchronizing ring 34 includes holes 100 that provide attachments for a clevis (not shown) that cooperates with the actuator 36 as is known.

The synchronizing assembly 31 includes a synchronizing ring 34 that is connected to the vanes 30 (FIG. 1) by arms 33, as illustrated in FIGS. 1 and 3. Vane arm bushings 76 are received within and supported by the synchronizing ring 34 and are operatively coupled to the arms 33.

An example bumper arrangement is illustrated in FIGS. 3-6, which only utilizes a single fastener. A cradle 78 is constructed from a stamped piece of sheet metal, which may be constructed from nickel, for example. The cradle 78 includes a base 98 having an integral tab 82, which is bent at generally a 90° angle relative to the base 98 in the example shown. The tab 82 abuts a lateral wall 44 of the synchronizing ring 34, which prevents rotation of the cradle 78 during installation and operation of the synchronizing assembly 31. The bumper 80 slides into the cradle 78 during assembly. In one example, the bumpers 80 are constructed from a composite polymer material, such as chopped fiber reinforced polyimide resin. In one example, the bumper is constructed from a DuPont VESPEL SCP-5050.

The bumper 80 includes a projection 60 that is integral with and extends from a base 61 to a sliding surface 62. The base 61 provides mounting flanges 88 on opposing sides of the projection 60. The hole 90 extends a depth 66 through the base 61 and the projection 60. The projection 60 has a perimeter shape 64, which is a quadrilateral, and in the example, a square. The sliding surface 62 is generally flat and engages the pads 40 when the synchronizing assembly 31 is installed on the engine 10.

The cradle 78 includes retaining walls 79 bent generally parallel to the base 98 to provide spaced apart channels 84, which receive opposing flanges 88 extending from opposite sides of the bumper 80. A hole 90, which is central within the projection 60, extends axially through the bumper 80. A bushing 48 is press fit into the hole 90 with the bushing 48 near the synchronizing ring 34 opposite the sliding surface 62. The bushing 48 includes a height 68 that is less than the depth 66. In one example, the bushing 48 is constructed from a stainless steel material. A fastener 92 is received within the hole 90 and bushing 48 to secure the bumper 90 and cradle 78 to the synchronizing ring 34 using a retainer 94 or nut. The fastener 92 includes a head 96 that is generally the same diameter as the hole 90 to retain the bumper 80 within the cradle 78 without applying any clamping load to the composite bumper. The head 96 does not extend beyond the sliding surface 62. In the example, the head 96 engages the bushing 48 such that that bumper 80 is not provided between the head 96 so that the bumper 80 is not loaded.

The cradle 78 includes notches 86 in the area of the channels 84, which provide clearance for the vane arm bushing 76, as best shown in FIG. 4. A shim can be used between the cradle 78 and synchronizing ring 34, if desired. A shim may be provided between the bumper assembly 38 and the wall 42 to provide the desired clearance between the circumferentially arranged bumper assemblies 38 and the compressor case 32. Thus, any shim, the bushing 48 and the cradle 78 comprise the loaded structure in the synchronizing assembly 31.

Figure 7A:
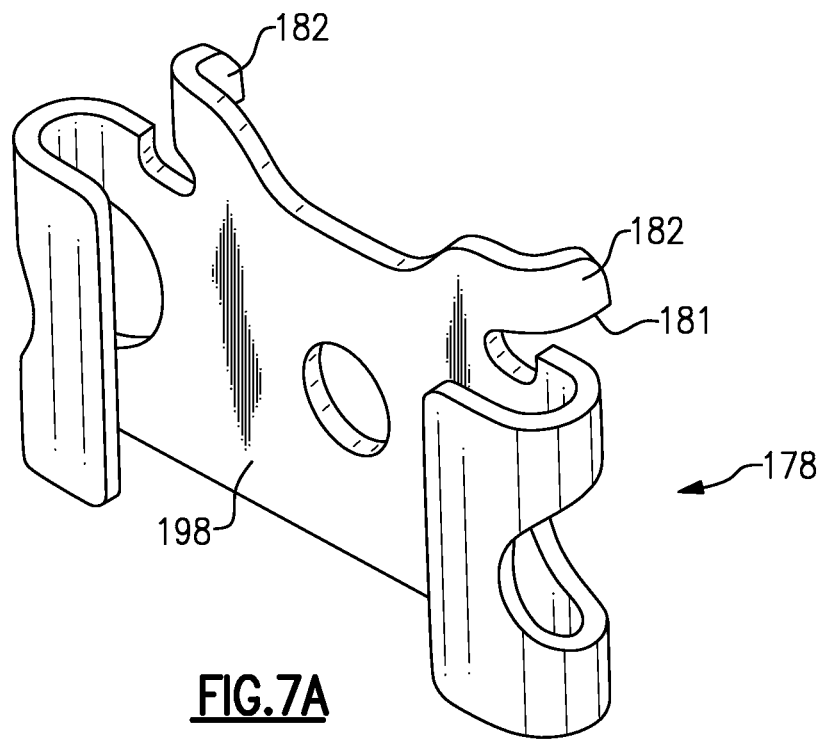
FIG. 7A is a perspective view of another example cradle.
Figure 7B:
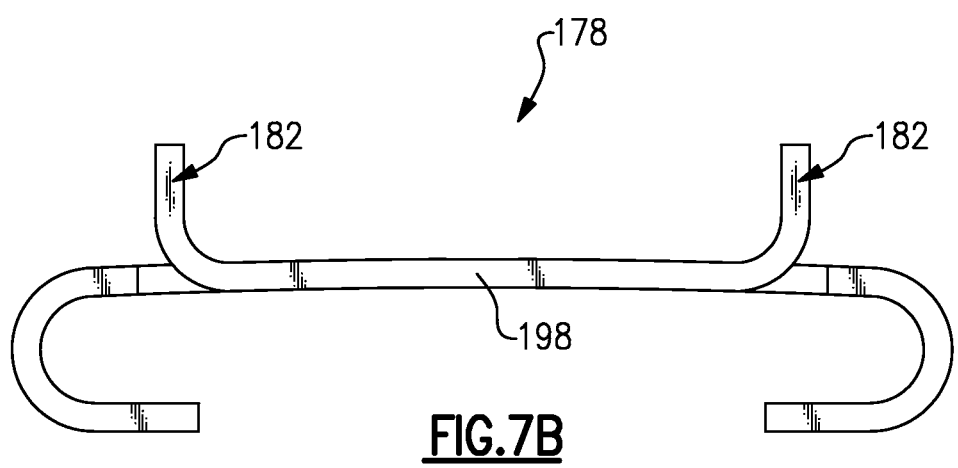
FIG. 7B is an end view of the cradle illustrated in FIG. 7A.

Another example cradle 178 is illustrated in FIGS. 7A and 7B. The cradle 178 includes a pair of tabs that are spaced from one another and extend from the base 198. The tab 182 of the cradle 178 is bent relative to the base 198 in a first direction to provide a face 181 that is generally 90° from the base 198. In the example shown in FIGS. 7A and 7B, the tabs 182 are bent in a different direction and provide edges 181, which abut the synchronizing ring 34 when assembled.

Although example embodiments have been disclosed, a worker of ordinary skill in this art would recognize that certain modifications would come within the scope of the claims. For that reason, the following claims should be studied to determine their true scope and content.

What is claimed is:

1. A synchronizing assembly for a gas turbine engine comprising:
    a synchronizing ring including axial spaced apart arcuate exterior walls;
    a cradle with an integrally formed tab abutting one of the arcuate exterior walls, the cradle secured to the synchronizing ring and located relative thereto by the tab; and
    a bumper supported within the cradle.

2. The synchronizing assembly according to claim 1, the cradle includes a base having a hole receiving a fastener securing the cradle to the synchronizing ring, and the tab extends from the base and is offset and non-concentric with respect to the fastener.

3. The synchronizing assembly according to claim 1, wherein the cradle includes opposing channels provided by retaining walls, and the bumper includes spaced apart flanges extending from a projection and received in the channels, the projection including a perimeter circumscribing the fastener and abutting the retaining walls and thereby circumferentially locate the bumper relative to the synchronizing ring.

4. The synchronizing assembly according to claim 3, comprising vane arm bushings supported in the synchronizing ring, wherein the channels include notches aligned with the vane arm bushings.

5. The synchronizing assembly according to claim 1, wherein the bumper includes a hole extending between opposing sides of the bumper, a bushing disposed in the hole in an interference fit, the fastener arranged within the bushing and the hole and including a head applying a clamping load to the cradle without applying the clamping load to the bumper.

6. The synchronizing assembly according to claim 1, wherein the bumper includes a composite polymer material.

7. The synchronizing assembly according to claim 1, wherein the cradle is a stamped piece of sheet metal.

8. The synchronizing assembly according to claim 1, wherein the bumper includes:
    a composite polymer block having a base and a projection integral with and extending from the base to a sliding surface, the base providing mounting flanges on opposing sides of the projection, a hole extending a depth through the base and the projection, and the projection having a perimeter shape; and
    a bushing received in the hole in an interference fit at a side having the mounting flanges, the bushing includes a height less than the depth.

9. The synchronizing assembly according to claim 8, wherein the sliding surface is generally flat.

10. The synchronizing assembly according to claim 8 wherein the base is generally rectangular, the perimeter shape is a quadrilateral.

11. The synchronizing assembly according to claim 8, wherein the hole is centrally located in the projection.

12. A method of assembling a synchronizing assembly comprising the steps of:
    sliding a bumper into a cradle;
    positioning the cradle onto a synchronizing ring with a locating feature arranged exteriorly of and in abutment with the synchronizing ring;
    inserting a fastener through holes in and extending entirely through the bumper and cradle; and
    fastening the bumper to the synchronizing ring.

13. The method according to claim 12, wherein the sliding step includes inserting opposing flanges of the bumper into opposing channels of the cradle.

14. The method according to claim 12, wherein the positioning step includes abutting a tab of the cradle against a lateral wall of the synchronizing ring.

15. The method according to claim 12, wherein the bumper includes a bushing, and the inserting step includes inserting the fastener through the bushing.

16. The method according to claim 15, wherein the fastening step includes clamping the bushing without clamping the bumper.

* * * * *